Aug. 19, 1941.   J. LANG   2,253,435
CONNECTION OF THE ENDS OF WIRES
Filed Dec. 26, 1939
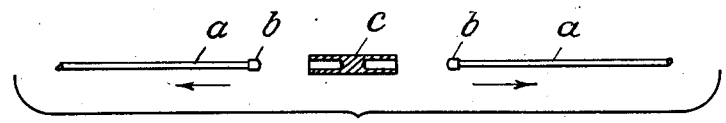
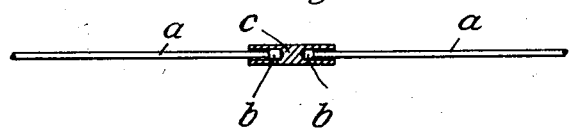
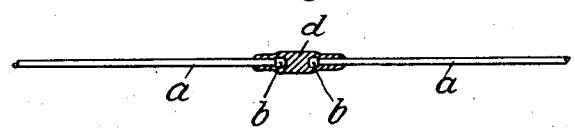
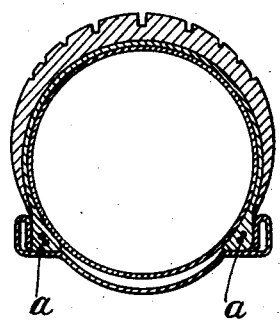

Patented Aug. 19, 1941

2,253,435

UNITED STATES PATENT OFFICE 2,253,435

CONNECTION OF THE ENDS OF WIRES

Josef Lang, Altena in Westphalia, Germany, assignor to P. A. Rentrop Akt. Ges., Stadthagen, Lippe, Germany Application December 26, 1939, Serial No. 310,984
In Germany April 25, 1938

1 Claim. (Cl. 287—109)

It is known to embed in the felloe beads of the tires of cycles and motor-cycles reinforcing and stiffening wires, which when correctly positioned in the felloe prevent detaching of the wire from the felloe. The embedding wires may consist of one coil or of several coils, the ends of which are connected the one with the other.

For the connecting of the wire ends different methods are known. One of these methods consists in obliquely welding the wire ends the one on the other and in upsetting them during the welding. The welding point is then ground down to the wire thickness and especially reinforced by a sheet metal sleeve placed around the wire and soldered on the same.

According to another method the wire ends are cut obliquely and the oblique faces connected the one with the other by means of hard soldering. Also in this method the soldering point is reinforced by a sheet metal sleeve.

A connection of wires in cycle-tires is further known, wherein the wires are intended as substitutes for a pneumatic tube and are consequently resilient. In this instance it is material to subsequently embed the wires in the finished tire with tension or pressure radially directed in outward direction. The loose, conical ends of the wire rings which are still open are inserted by means of suitable tools into conical bores of a sleeve, which is solid at the middle. A wire connection of this type cannot be used for rings embedded in the beads of tires for cycles and motorcycles. Rings of this type are submitted to tensile stress. The known connection would detach as it is produced merely by the radial pressure exerted allround on the wire ring.

Another known connection of the ends of wires to be embedded consists in holding together the wire ends having right- or left-hand screw threads in a sleeve with corresponding thread. This arrangement possesses the inconvenience, that the wire must be much thicker by the amount by which it is thinned in cross-section by the cutting of the screw threads. The reinforcing sleeve is in this known arrangement solid between the screw threaded portions but crosswise bored in the middle for the engagement of a tool. Compared herewith the sleeve in the connection according to the invention is solid in the cross-section through the middle.

Finally it has already become known to equip the wire ends with head-like thickenings produced by upsetting and to push them the one against the other, whereupon a connection sleeve is pushed over the thickened portions at the wire ends, the internal diameter of the bore of this sleeve being equal to the external diameter of the thickened portions, and to press on to the wire the free ends of the sleeve which extends over the thickenings in both directions.

According to the invention the connection is similar to this known connection. The wires have each a thickened end produced by upsetting or in any other suitable manner and are accommodated in a sleeve which is extended to beyond the thickened portions and subsequently tightly pressed on the wires.

The sleeve is, however, of solid cross-section in the middle between the two bores. This construction is based on the following experience.

When the wire ends are connected by a seamless sleeve bored from one end to the other, tearing tests show that the sleeve tears in the middle, that is where the oblique end faces of the two wire thickenings bear obliquely the one on the other.

The reason for this phenomenon is that, when the protecting sleeve portions are pressed on to the wires in that portion which is not bored a prejudicial tension is introduced by the closing of the projecting sleeve elements and a weakened point is produced.

The portion of the sleeve engaging over the wire thickenings is therefore already considerably pre-stressed to pull. If, however, the sleeve preserves according to the invention its solid cross-section in the middle portion so that the ends of the wire thickenings cannot bear the one against the other, a tension will be caused when the projecting ends of the connection sleeve are closed, and this tension will come into effect chiefly in the middle of the sleeve, but it can never become prejudicial because the sleeve is at this point of solid cross-section.

An embodiment of the invention is illustrated by way of example in the accompanying drawing, in which:

Fig. 1 shows the connecting sleeve and the two wires to be connected separated the one from the other.

Fig. 2 shows the thickened wire ends inserted into the sleeve.

Fig. 3 shows the wire end connection after the sleeve has been pressed around the wires.

Fig. 4 shows in cross-section a tire with two embedded wires.

As shown in Fig. 1 the ends $a$ of a wire ring have each a thickening $b$ preferably produced by upsetting. A sleeve $c$ for connecting the wire ends is bored from both sides, the internal diameter of the bore being equal to the outer diameter of the thickened ends b of the wires.

The connecting sleeve is at the middle solid in cross-section as shown in Fig. 1.

The wire ends a with the thickenings b are introduced into the sleeve c from both ends until the thickened ends bear against the ends of the bores in the sleeve, the ends of the connecting sleeve projecting from the thickened ends b of the wires are pressed together as shown in Fig. 3 by means of any suitable tool, such as a bipartite pressing die with corresponding indentations. Fig. 4 shows in cross-section a wheel tire with only two embedded wires a by way of example.

If during the compressing of the sleeve ends also the middle portion c of the sleeve is submitted to tensile stress as shown in Fig. 3, this tension is harmless relative to the tearing strength of the whole ring, because it comes into effect at the solid cross-section of the sleeve, which at this point has the highest tearing strength within the ring system.

I claim:

In a connector for the ends of wires to be embedded in tires of cycles and motor cycles, wherein each wire end has an enlarged solid head, said connector comprising a sleeve open at both ends and having a solid partition intermediate the ends for abutting contact by the heads on the ends of the wires and the walls of the sleeve adapted to be pressed into binding engagement with the heads of the wires and those portions of the wires within the sleeve ends for interlockingly connecting the wire ends with the sleeve.

JOSEF LANG.